(12) United States Patent
Paternoster et al.

(10) Patent No.: US 11,565,325 B2
(45) Date of Patent: Jan. 31, 2023

(54) POWDER DISCHARGE UNIT, DEVICE, AND METHOD FOR GENERATIVELY MANUFACTURING A THREE-DIMENSIONAL OBJECT

(71) Applicant: EOS GmbH Electro Optical Systems, Krailling (DE)

(72) Inventors: Stefan Paternoster, Andechs (DE); Stefan Grünberger, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 876 days.

(21) Appl. No.: 16/060,199

(22) PCT Filed: Nov. 17, 2016

(86) PCT No.: PCT/EP2016/078058
§ 371 (c)(1),
(2) Date: Jun. 7, 2018

(87) PCT Pub. No.: WO2017/102242
PCT Pub. Date: Jun. 22, 2017

(65) Prior Publication Data
US 2018/0361662 A1    Dec. 20, 2018

(30) Foreign Application Priority Data

Dec. 15, 2015 (DE) .......................... 102015225344.9

(51) Int. Cl.
*B22F 12/00* (2021.01)
*B33Y 10/00* (2015.01)
(Continued)

(52) U.S. Cl.
CPC ............ *B22F 12/00* (2021.01); *B29C 31/066* (2013.01); *B29C 64/153* (2017.08);
(Continued)

(58) Field of Classification Search
CPC ........................... B29C 64/255; B29C 64/205
See application file for complete search history.

(56) References Cited

U.S. PATENT DOCUMENTS

| 4,352,660 | A | * | 10/1982 | Steiner et al. | .............. 432/14 |
| 6,401,001 | B1 | | 6/2002 | Jang et al. | |
| 2005/0074550 | A1 | | 4/2005 | Leuterer et al. | |
| 2008/0006334 | A1 | | 1/2008 | Davidson et al. | |
| 2008/0006958 | A1 | | 1/2008 | Davidson | |
| 2008/0047628 | A1 | | 2/2008 | Davidson et al. | |
| 2008/0060330 | A1 | | 3/2008 | Davidson et al. | |

(Continued)

FOREIGN PATENT DOCUMENTS

| CN | 101495294 | 7/2009 |
| CN | 101932429 | 12/2010 |

(Continued)

OTHER PUBLICATIONS

International Search Report for Application No. PCT/EP2016/078058 dated Mar. 6, 2017, 3 pages.

*Primary Examiner* — Jacob T Minskey
*Assistant Examiner* — Adrien J Bernard
(74) *Attorney, Agent, or Firm* — Seyfarth Shaw LLP

(57) ABSTRACT

A powder discharge unit for equipping and/or upgrading a device for generatively manufacturing a three-dimensional object by a selective layer-by-layer solidification of building material in powder form includes a powder container for receiving building material in powder form and a filling chamber for filling in building material in powder form into the powder container. The powder discharge unit is configured to fluidise the building material in powder form in the powder container and the building material in powder form in the filling chamber independently of one another.

12 Claims, 3 Drawing Sheets

(51) Int. Cl.
   *B33Y 30/00*     (2015.01)
   *B33Y 40/00*     (2020.01)
   *B29C 64/153*    (2017.01)
   *B29C 31/06*     (2006.01)
   *B29C 64/321*    (2017.01)
   *B29C 64/343*    (2017.01)
   *B33Y 40/10*     (2020.01)
   *B29C 64/255*    (2017.01)
   *B29C 64/205*    (2017.01)
   *B22F 10/10*     (2021.01)

(52) U.S. Cl.
   CPC .......... *B29C 64/205* (2017.08); *B29C 64/255* (2017.08); *B29C 64/321* (2017.08); *B29C 64/343* (2017.08); *B33Y 10/00* (2014.12); *B33Y 30/00* (2014.12); *B33Y 40/00* (2014.12); *B33Y 40/10* (2020.01); *B22F 10/10* (2021.01); *B22F 2999/00* (2013.01); *Y02P 10/25* (2015.11)

(56) References Cited

U.S. PATENT DOCUMENTS

| | | |
|---|---|---|
| 2009/0017220 A1 | 1/2009 | Muller et al. |
| 2009/0068376 A1 | 3/2009 | Philippi et al. |
| 2009/0206522 A1 | 8/2009 | Hein et al. |
| 2016/0074938 A1 | 3/2016 | Kitani et al. |
| 2016/0228918 A1* | 8/2016 | She .................. B01J 8/1854 |
| 2016/0279871 A1 | 9/2016 | Heugel et al. |

FOREIGN PATENT DOCUMENTS

| | | |
|---|---|---|
| CN | 105722664 | 6/2016 |
| DE | 69202294 | 1/1996 |
| DE | 10105504 | 8/2002 |
| DE | 102005022308 | 11/2006 |
| DE | 102006053121 | 12/2007 |
| DE | 102015213011 | 1/2017 |
| EP | 0506180 | 5/1995 |
| FR | 2474153 | 7/1981 |
| WO | 2007139938 | 12/2007 |
| WO | 2014176045 | 10/2014 |
| WO | 2014188778 | 11/2014 |

* cited by examiner a)

b)

c)

d)

POWDER DISCHARGE UNIT, DEVICE, AND METHOD FOR GENERATIVELY MANUFACTURING A THREE-DIMENSIONAL OBJECT

TECHNICAL FIELD OF THE INVENTION

The present invention relates to a device and a method for generatively manufacturing a three-dimensional object by a layer-by-layer application and selective solidification of a building material in powder form, in particular to a powder discharge unit comprised in this device and used in this method.

BACKGROUND OF THE INVENTION

Devices and methods of this type are, for instance, used in Rapid Prototyping, Rapid Tooling, or Additive Manufacturing. An example of such a method is known as the "selective laser sintering or melting". In the course of this, a thin layer of a building material in powder form is repeatedly applied, and the building material in each layer is selectively solidified by selectively irradiating it using a laser beam.

DE 10 2005 022 308 A1 describes a laser sintering device in which the building material in powder form is applied by means of a recoating unit in the form of a double blade consisting of two rigid blades movable back and forth across a build area. The recoating unit is, first, filled from a storage container with an amount of the building material sufficient for applying a layer and, then, moves across the build area, wherein the powder received in the recoating unit is stretched to a thin powder layer.

In the patent application DE 10 2015 213 011, which was not yet published at the date of filing of the application, a recoater is described comprising, apart from the recoating unit stretching the powder to a thin powder layer, a preheat module separately formed and movable together with the recoating unit. In the course of this, the amount of the building material sufficient for applying a layer is received not by the recoating unit itself, but by the preheat module, and is dispensed to the recoating unit continuously or in portions during the movement across the build area. In the preheat module, the powder is fluidised and preheated by means of a radiation heater.

Due to the fluidisation it may happen that fine powder particles are discharged from the preheat module with the medium used for the fluidisation. Further, it may happen during the acceleration or slowdown of the module that fluidised powder, exhibiting properties similar to a liquid, slops over the edge of the preheat module.

SUMMARY OF THE INVENTION

It is the object of the present invention to provide an alternative or, respectively, improved device or, respectively, an alternative or, respectively, improved method for generatively manufacturing a three-dimensional object by a layer-by-layer application and selective solidification of a building material in powder form, in particular, to provide a powder discharge unit comprised in this device and used in this method with which the discharge of fine powder particles and/or the slopping of fluidised powder is reduced.

This object is achieved by a powder discharge unit according to claim 1, a recoater according to claim 8, a device according to claim 10, and a method according to claim 12. Further developments of the invention are respectively provided in the dependent claims. In the course of this, the method may also be further developed by the features of the devices provided below or, respectively, set forth in the dependent claims or vice versa, or, respectively, the features of the devices may also be respectively used among themselves for a further development.

The powder discharge unit according to the invention serves for equipping and/or upgrading a device for generatively manufacturing a three-dimensional object by a selective layer-by-layer solidification of building material in powder form. The device comprises a recoater movable across a build area for applying a layer of the building material to the build area and a solidification device for selectively solidifying the applied layer at points corresponding to a cross-section of the object to be manufactured. The device is configured and/or controlled to repeat the steps of applying and selectively solidifying until the object is completed. The powder discharge unit comprises a powder container for receiving building material in powder form and a filling chamber for filling in building material in powder form into the powder container. The powder discharge unit is configured to fluidise the building material in powder form in the powder container and in the filling chamber independently of one another. With such a powder discharge unit it is, for instance, possible to fluidise the powder in the powder container, but not to fluidise the powder in the filling chamber while the powder discharge unit moves across the build area, whereby a discharge of fine powder particles and/or a slopping of fluidised powder can be effectively reduced or even prevented.

Preferably, the powder discharge unit further comprises a dosing device configured to dispense the building material in powder form contained in the powder container to a recoating unit of the recoater of the device continuously or in portions. Thereby one can, for instance, achieve that the recoating unit always receives only as much powder as currently required for the recoating.

Preferably, the powder container and/or the filling chamber comprises a bottom having a porous plate and/or perforated plate through which gas can be guided into the powder container and/or into the filling chamber independently of one another, wherein the bottom preferably comprises a heating element for heating the porous plate and/or the perforated plate and/or the gas. Thereby, for instance, the fluidising and/or heating of the powder in the powder discharge unit can be performed in a simple manner. Thereby, for instance, the fluidisation in the powder container and in the filling chamber can be performed and the gas used for the fluidisation can be directly or indirectly heated.

Preferably, the powder container and the filling chamber are partial chambers of a container separated from each other in sections by a separating wall. Thereby, for instance, the powder discharge unit can be realised in a particularly simple manner.

Preferably, the powder container and the filling chamber are formed as two separate units being interconnected. Thereby, for instance, a flexible designing of powder container and filling chamber can be carried out independently of one another.

Preferably, a connecting point between the filling chamber and the powder container is arranged in the lower half of the powder discharge unit, preferably at the bottom of the powder discharge unit. Thereby, for instance, the powder can be evenly distributed between filling chamber and powder container in a simple manner when it is being fluidised both in the region of the filling chamber and in the region of the powder container.

Preferably, the powder container comprises at its upper side a radiation heater for preheating the building material in powder form received therein. Thereby, for instance, the building material in powder form can be brought up to a required working temperature more quickly. Additionally, a covering of the powder container may be provided, for example, in the form of a (permanently installed or detachable) cap, which is, for instance, arranged above the radiation heater or into which the radiation heater is integrated.

The recoater according to the invention serves for equipping and/or upgrading a device for generatively manufacturing a three-dimensional object by a selective layer-by-layer solidification of building material in powder form. The device is adapted to receive the recoater such that it is movable across a build area for applying a layer of the building material to the build area. The device comprises a solidification device for selectively solidifying the applied layer at points corresponding to a cross-section of the object to be manufactured. The device is configured and/or controlled to repeat the steps of applying and selectively solidifying until the object is completed. The recoater comprises a powder discharge unit of the type described above. Thereby, for instance, the effects of the powder discharge unit according to the invention can be achieved with a recoater comprising the powder discharge unit.

Preferably, the recoater further comprises a recoating unit suitable for receiving the building material dispensed by the powder discharge unit and for applying the building material to the build area, wherein the recoating unit is preferably realised as being movable together with the powder discharge unit. Thereby, for instance, the powder discharge unit can dispense the building material in powder form contained in the powder container to the recoating unit continuously or in portions, and preferably, for instance, a separate drive for the powder discharge unit can be saved.

The device according to the invention serves for generatively manufacturing a three-dimensional object by a selective layer-by-layer solidification of building material. The device comprises a recoater movable across a build area for applying a layer of the building material to the build area and a solidification device for selectively solidifying the applied layer at points corresponding to a cross-section of the object to be manufactured. The device is configured and/or controlled to repeat the steps of applying and selectively solidifying until the object is completed. The device further comprises a powder discharge unit according to the invention and/or the recoater is formed as a recoater according to the invention. Thereby, for instance, the effects of the powder discharge unit according to the invention can be achieved with a device for generatively manufacturing a three-dimensional object comprising the powder discharge unit and/or a recoater comprising the powder discharge unit.

Preferably, the powder discharge unit is mounted as being movable together with a recoating unit of the recoater. Thereby, for instance, a separate drive for the powder discharge unit can be saved.

The method according to the invention serves for generatively manufacturing a three-dimensional object by a layer-by-layer application and selective solidification of a building material in powder form. The method comprises the steps of applying a layer of the building material in powder form to a build area by means of a recoater moving across the build area and selectively solidifying the applied powder layer at points corresponding to a cross-section of the object to be manufactured. The steps of applying and selectively solidifying are repeated until the object is completed. The step of applying is performed with the aid of a powder discharge unit comprising a powder container for receiving building material in powder form and a filling chamber for filling in building material in powder form into the powder container, wherein the powder discharge unit receives building material in powder form via the filling chamber and fluidises the building material in powder form contained in the powder discharge unit independently of one another for the powder container and for the filling chamber. Thereby, for instance, the effects of the powder discharge unit according to the invention can be achieved in a method of generatively manufacturing a three-dimensional object carried out using the powder discharge unit.

Preferably, the powder discharge unit dispenses the building material in powder form contained in the powder container to a recoating device of the recoater of the device continuously or in portions and/or is moved together with the recoating device of the recoater across the build area. By dispensing continuously or, respectively, in portions one can, for instance, achieve that the recoating unit always receives only as much powder as currently required for the recoating; by the joint movement, for instance, a separate drive for the powder discharge unit can be saved.

Preferably, during the process of receiving the building material in powder form via the filling chamber, the building material in powder form is being fluidised in the powder container of the powder discharge unit and in the filling chamber of the powder discharge unit, and while moving the powder discharge unit across the build area, the building material in powder form is not being fluidised in the filling chamber of the powder discharge unit, but is being fluidised in the powder container of the powder discharge unit. Thereby, for instance, a discharge of fine powder particles and/or a slopping of fluidised powder from the powder discharge unit, in particular from the powder container, can be effectively reduced or even prevented.

Preferably, gas is guided into the powder container and/or into the filling chamber independently of one another through a porous plate and/or perforated plate comprised in the bottom of the powder discharge unit, wherein preferably the porous plate and/or the perforated plate and/or the gas is being heated. Thereby, for instance, the fluidisation in the powder container and in the filling chamber can be performed and the gas used for the fluidisation can be directly or indirectly heated.

BRIEF DESCRIPTION OF THE DRAWINGS

Further features and the usefulness of the invention will arise from the description of examples of embodiments on the basis of the accompanying drawings.

DETAILED DESCRIPTION OF THE EMBODIMENTS

Figure 1:
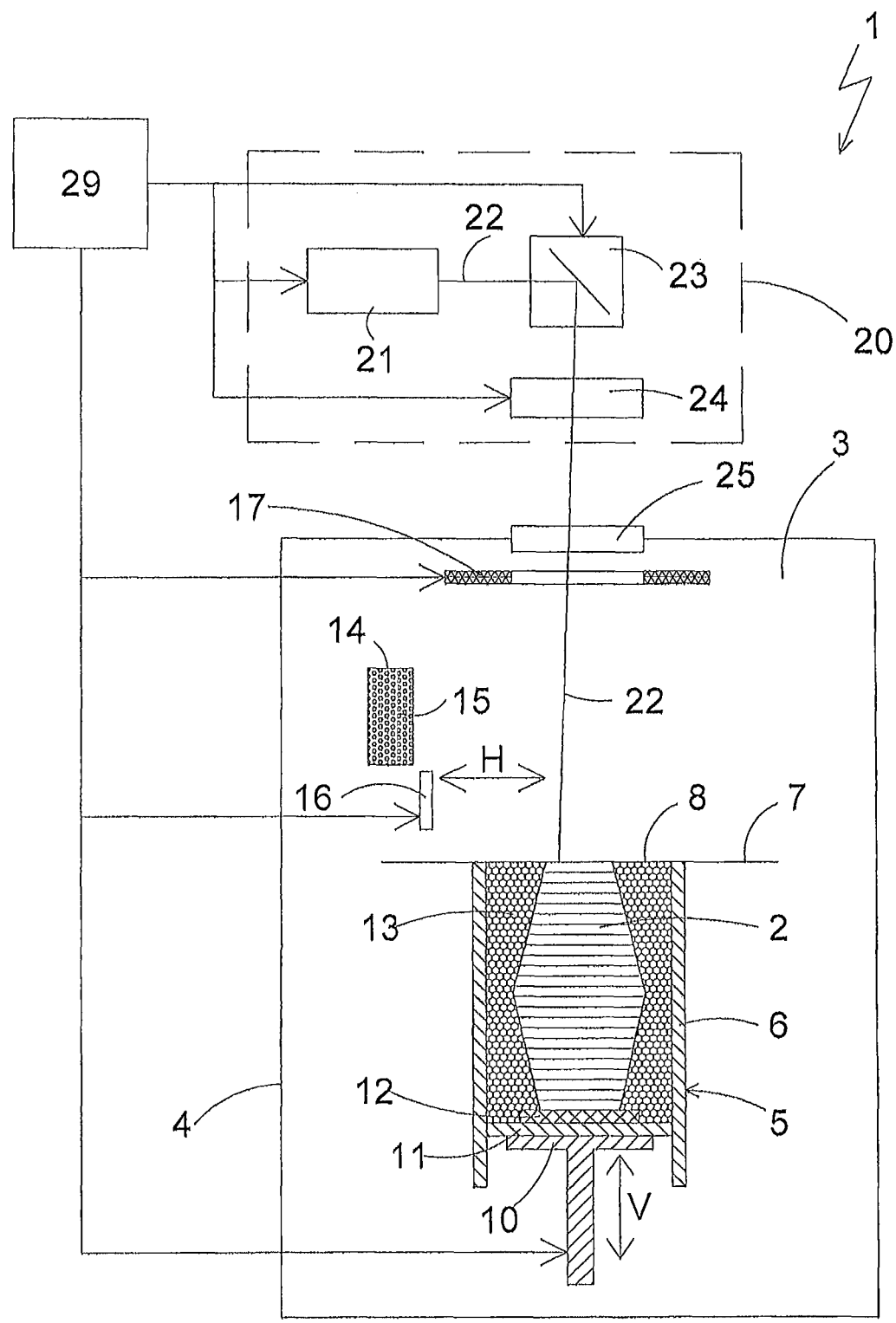
FIG. 1 is a schematic, partially cross-sectional view of a device for generatively manufacturing a three-dimensional object according to the present invention.

In the following, a first embodiment of the present invention is described referring to FIGS. 1 and 2. The device shown in FIG. 1 is a laser sintering or laser melting device 1. For building up an object 2, it contains a process chamber 3 having a chamber wall 4.

In the process chamber 3, a container 5 open to the top and having a container wall 6 is arranged. By the upper opening of the container 5, a working plane 7 is defined, wherein the region of the working plane 7 lying within the opening which can be used for building up the object 2 is denoted as build area 8.

In the container 5, a support 10 movable in a vertical direction V is arranged at which a base plate 11 is mounted which closes the container 5 in a downward direction and thereby forms its bottom. The base plate 11 may be a plate formed separately from the support 10, which is attached to the support 10, or it may be integrally formed with the support 10. Depending on a powder used and a process, a building platform 12 on which the object 2 is built up may further be mounted on the base plate 11. However, the object 2 may also be built up on the base plate 11 itself, which then serves as a building platform. In FIG. 1, the object 2 to be built in the container 5 on the building platform 12 is shown below the working plane 7 in an intermediate state having several solidified layers surrounded by building material 13 remaining non-solidified.

The laser sintering device 1 further contains a storage container 14 for a building material 15 in powder form which can be solidified by electromagnetic radiation and a recoater 16 movable in a horizontal direction H for applying the building material 15 to the build area 8. Further, a radiation heater 17 is arranged in the process chamber which serves for heating the building material 15 applied to the build area 8. The radiation heater 17 is, for instance, formed as an infrared radiator.

The laser sintering device 1 further contains an irradiation device 20 having a laser 21 generating a laser beam 22 deflected via a deflecting device 23 and focused by a focusing device 24 via a coupling window 25, which is mounted at the upper side of the process chamber 3 in the chamber wall 4, onto the working plane 7.

The laser sintering device 1 further contains a control unit 29 via which the individual component parts of the device 1 are controlled in a coordinated manner for performing the building process. The control unit may also be mounted partially or completely outside the device. The control unit may contain a CPU whose operation is controlled by a computer program (software). The computer program may be stored separately from the device on a storage medium, from which it can be loaded into the device, in particular, into the control unit.

During operation, first, the support 10 is lowered for the application of a powder layer by a height corresponding to the desired layer thickness. The recoater 16, first, moves to the storage container 14 and receives from it an amount of the building material 15 sufficient for applying a layer. Then it moves across the build area 8 and applies there a thin layer of the building material 15 in powder form. The application is performed at least over the total cross-section of the object 2 to be manufactured, preferably across the whole build area 8, i.e. the region of the working plane 7 which can be lowered by a vertical movement of the support. Subsequently, the building material in powder form is heated up by the radiation heater 17. After reaching a working temperature, the cross-section of the object 2 to be manufactured is scanned by the laser beam 22, so that the building material 15 in powder form is solidified at the points corresponding to the cross-section of the object 2 to be manufactured. These steps are repeated as long as until the object 2 is completed and can be removed from the process chamber 3.

The recoater comprises a recoating unit (not shown) effecting the direct application of the powder layer to the build area. This recoating unit may, for instance, comprise a wiper blade and/or a blade and/or a double blade as in the prior art described at the outset and/or a roller and/or any other recoating element suitable for applying a layer of the building material in powder form. Further, the recoater comprises a powder discharge unit receiving the building material in powder form from the storage container and dispensing it to the recoating unit continuously or in portions. Preferably, the recoating unit and the powder discharge unit are realised as being movable together conjointly.

Figure 2:
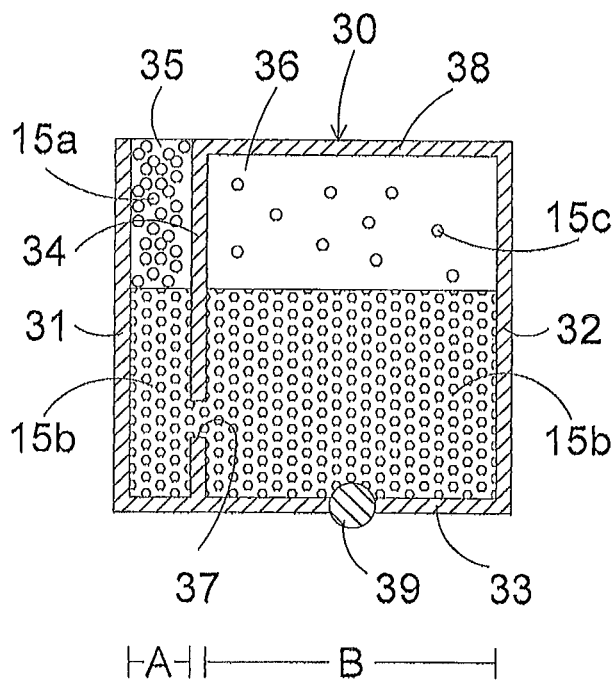
FIGS. 2a to 2d are schematic cross-sectional views of a powder discharge unit according to a first embodiment of the present invention in different operating states, contained in the device shown in FIG. 1.
Figure 2:
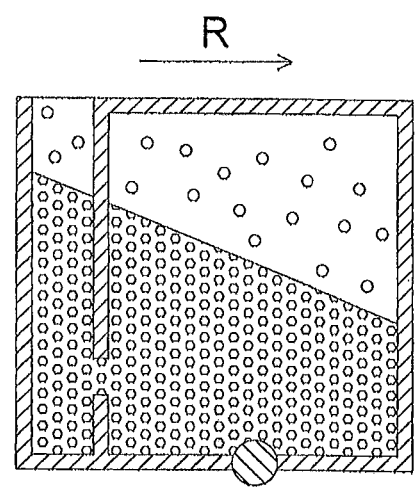
Figure 2:
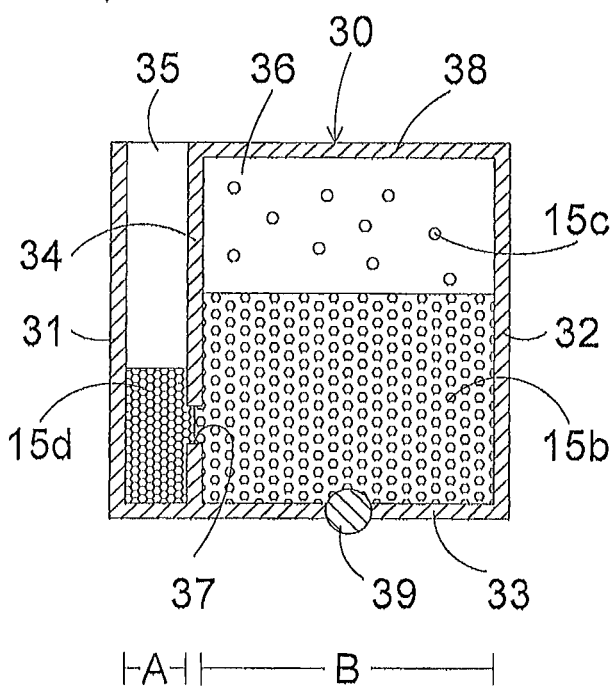
Figure 2:
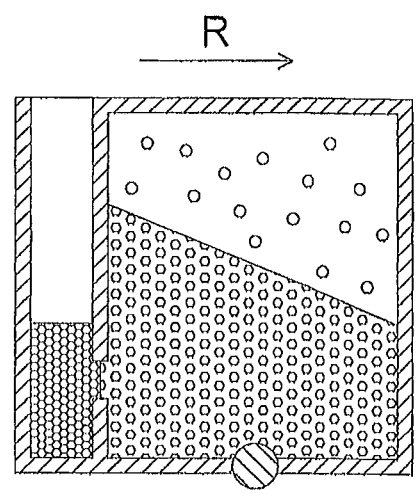

FIG. 2 shows a schematic cross-sectional view of a powder discharge unit 30 according to the first embodiment.

As can be seen from FIG. 2a, the powder discharge unit 30 comprises side walls 31, 32, a front wall (not shown), a back wall (not shown), and a bottom 33. It is subdivided by a separating wall 34 into two chambers, of which a first chamber 35 serves as a filling chamber for introducing building material 15 in powder form and a second chamber 36 as a powder container for keeping the building material in powder form introduced via the filling chamber 35. The two chambers are in connection with each other via a connecting opening 37 formed at a suitable point of the separating wall. Preferably, this connecting opening 37 is arranged in the lower half of the powder discharge unit 30. In FIG. 2a, the connecting opening 37 is shown at a distance from the bottom 33, it may however also extend to the bottom 33. What is important is that the powder fill level is higher than the upper edge of the connecting opening 37 during the operation of the powder discharge unit 30.

The powder container 36 is closed to the top by a cap 38, whereas the filling chamber 35 is open to the top. A dosing device 39, for instance, in the form of a slide, a knife, a spindle, or another suitable form by means of which building material in powder form can be dosed and dispensed to the recoating unit, is arranged in the bottom of the powder container 36.

The bottom 33 of the powder discharge unit 30 is designed such that the received building material in powder form can be fluidised. To this end, the bottom 33 comprises a porous plate and/or a perforated plate through which gas can be guided into the powder container and into the filling chamber. According to the present invention, the bottom 33 is designed such that gas can be supplied to a region A corresponding to the filling chamber 35 and to a region B corresponding to the powder container 36 independently of one another, so that the building material in powder form in the filling chamber 35 and in the powder container 36 can be fluidised to different degrees.

Preferably, the powder discharge unit 30 comprises at its bottom 33 a heating element (not shown) for heating the porous plate or, respectively, perforated plate and/or the gas. Preferably, the powder discharge unit 30 further comprises at the upper side 38 of the powder container 36 a radiation heater (not shown) for preheating the building material in powder form received therein.

FIG. 2a shows a state during the filling of the powder discharge unit 30 with building material in powder form. The powder is dispensed by a powder outlet (not shown) of the storage container or an intermediate module arranged between the storage container and the powder discharge unit 30 and arrives in the filling chamber 35 of the powder discharge unit 30 as loose material 15a.

During the filling-in, gas is guided into both chambers of the powder discharge unit 30 and generates a fluidised bed of the building material in powder form, i.e. the gas transfers the powder into a state similar to a fluidised bed or, respectively, fluid bed, in which it has liquid-like properties. Thereby, the fluidised powder 15b is distributed through the connecting opening 37 uniformly between the filling chamber 35 and the powder container 36 of the powder discharge unit 30 and has an approximately horizontal surface. Fine powder particles 15c can also be discharged by the gas out of the fluidised bed of the fluidised powder 15b into the space above the surface of the fluidised powder bed.

In the course of this, the fluidisation need not be exactly the same in the filling chamber 35 and the powder container 36, it only needs to be sufficiently great in both chambers in order that the powder in both chambers is transferred into a state similar to a fluidised bed.

FIG. 2b shows a state which would result if the powder discharge unit 30 was moved in a direction R in this state.

Due to the acceleration generated during the start-up, the fluidised powder 15b, which behaves similarly to a liquid, slops backwards in the movement direction R. In the course of this, a slopping over of powder out of the powder discharge unit 30 can occur. Besides, due to the fluidisation, fine powder particles 15c are discharged out of the fluidised powder bed 15b also in the filling chamber 35 and can escape to the outside through the opening of the filling chamber 35.

In order to prevent this, during the movement of the powder discharge unit 30, the fluidisation is switched off in the region A of the bottom 33 or, respectively, the gas supply is reduced in this region to such an extent that no fluidised bed having liquid-like properties can be generated there. This state is shown in FIG. 2c.

Due to the switch-off of the fluidisation, the powder in the filling chamber 35 is not in the form of a fluidised bed, but in the form of a fixed bed 15d. Thus, the powder bed does not have liquid-like properties in this region anymore, but forms a solid powder stopper.

As shown in FIG. 2d, this powder stopper 15d acts as a side seal for the powder container 36. The fluidised bed 15b can slop during the movement of the powder discharge unit 30 only inside the closed powder container 36, but no more in the filling chamber 35. Furthermore, the fine powder particles 15c exit the surface of the fluidised bed 15b only inside the powder container 36, but no more in the filling chamber 35.

Thus, a slop-over of powder and a discharge of fine powder particles from the powder discharge unit 30 can be prevented.

Since the gas streams from bottom to top through the powder, the fluidisation primarily takes effect upwards. Thereby, regions fluidised to different degrees are laterally well separated from each other even if no separating wall is arranged between them, i.e. for instance if the connecting opening 37 extends to the bottom 33.

During the process of manufacturing the three-dimensional object 2, i.e. during the process of receiving building material in powder form 15a via the filling chamber, the powder 15b is being fluidised in the powder container 36 of the powder discharge unit 30 and in the filling chamber 35 of the powder discharge unit 30. However, while moving the powder discharge unit 30 across the build area 8, only the powder 15b in the powder container 36 is being fluidised, but the powder 15d in the filling chamber 35 is not being fluidised. In the course of this, being fluidised means that sufficient gas is supplied in order to transfer the powder bed into a state of a fluidised bed, whereas not being fluidised means that no gas at all or only so little gas is supplied that the powder bed is not transferred into a state of a fluidised bed.

Figure 3:
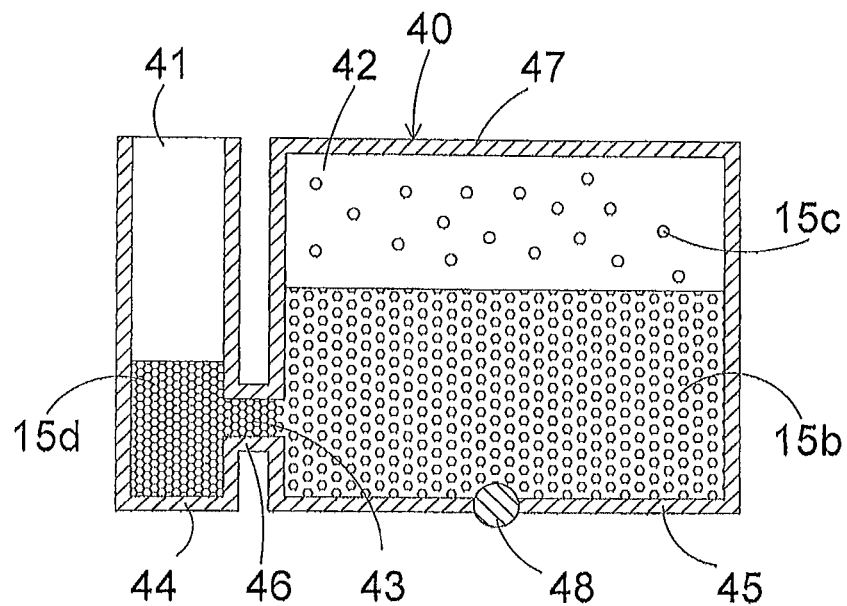
FIG. 3 is a schematic cross-sectional view of a powder discharge unit according to a second embodiment of the present invention.

FIG. 3 shows a schematic cross-sectional view of a powder discharge unit 40 according to a second embodiment.

Whereas, in the powder discharge unit 30, the filling chamber 35 and the powder container 36 are two chambers of a container subdivided by a separating wall 34, in the powder discharge unit 40, they are formed as two separate containers 41, 42 interconnected via a connecting piece 43. Preferably, the connecting piece 43 is arranged in the lower half of the powder discharge unit 40. In FIG. 3, the connecting piece 43 is shown to be at a distance from the bottom, it may, however, also be arranged at the height of the bottom. What is important is that the powder fill level is higher than the upper edge of the connecting piece 43 during the operation of the powder discharge unit 40.

Since the filling chamber 41 and the powder container 42 are formed as separate containers in this embodiment, also the bottom 44 of the filling chamber 41, the bottom 45 of the powder container 42, and the bottom 46 of the connecting piece 43 are formed separately from one another. Also in this embodiment, gas can be supplied to the bottom 44 of the filling chamber 41 and to the bottom 45 of the powder container 42 independently of one another, so that the building material in powder form in the filling chamber 41 and in the powder container 42 can be fluidised to different degrees. Preferably, the gas supply and thus the fluidisation is carried out in the connecting piece 43 in the same manner as in the filling chamber 41, it may, however, also be carried out in the same manner as in the powder container 42 or separately from both.

The remaining construction as well as operation and effects of the present embodiment are the same as in the first embodiment, so that their description is not repeated here. In particular, also the powder discharge unit 40 comprises a capping 47 for the powder container 42 and a dosing device 48 at its bottom 45 for dispensing the building material in powder form to the recoating unit.

Figure 4:
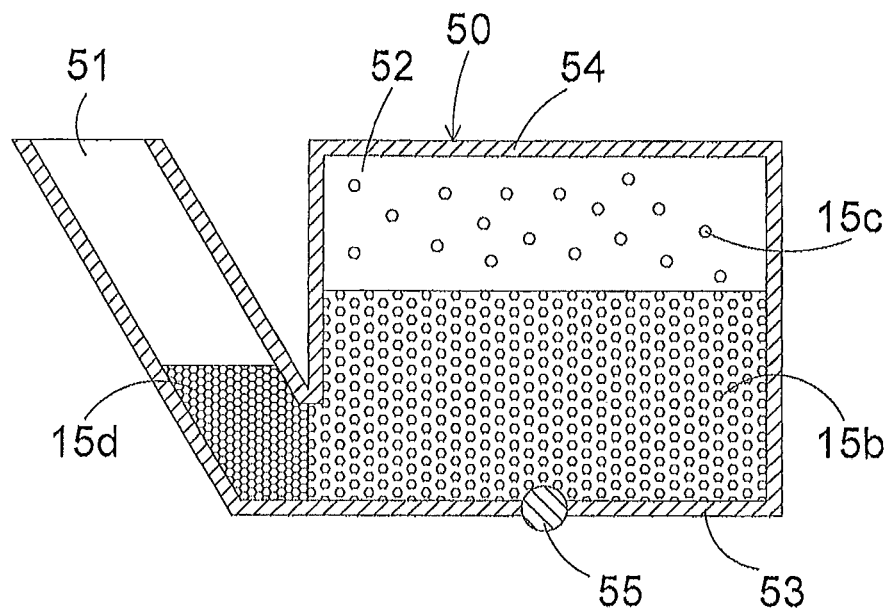
FIG. 4 is a schematic cross-sectional view of a powder discharge unit according to a third embodiment of the present invention.

FIG. 4 shows a schematic cross-sectional view of a powder discharge unit 50 according to a third embodiment.

In the powder discharge unit 50, the filling chamber 51 is arranged aslant and connected at its lower side to the powder container 52. The common bottom 53 is designed such that gas can be supplied to the filling chamber 51 and to the powder container 52 independently of one another, so that the building material in powder form in the filling chamber 51 and in the powder container 52 can be fluidised to different degrees.

In this case, the building material in powder form does not fall into the filling chamber 51 vertically, but slides down its wall and can undermine the fluidised layer 15b in the powder container 52 by its impulse from the inclined plane.

The remaining construction as well as operation and effects of the present embodiment are the same as in the first embodiment, so that their description is not repeated here. In particular, also the powder discharge unit 50 comprises a capping 54 for the powder container 52 and a dosing device 55 at its bottom 53 for dispensing the building material in powder form to the recoating unit.

The features of the above-described embodiments may, wherever possible, be combined with each other. So, for instance, the slanting filling chamber of the third embodiment can also be connected to the powder container via a connecting piece as in the second embodiment instead of being directly connected to it, or a separating wall having a connecting opening can be provided as in the first embodiment. The heating element at the bottom of the powder container and/or the radiation heater at its upper side can also be provided in the second or third embodiment.

The powder discharge unit, or, respectively, the recoater can be, as described above, a component part of a device for generatively manufacturing a three-dimensional object, however, they can also be provided as a separate module for equipping and/or upgrading such a device.

Even though the present invention has been described on the basis of a laser sintering or, respectively, laser melting device, it is not limited to the laser sintering or laser melting. It may be applied to arbitrary methods of generatively manufacturing a three-dimensional object by a layer-by-layer application and selective solidification of a building material in powder form.

The irradiator may, for instance, comprise one or more gas or solid state lasers or any other type of lasers, such as e.g. laser diodes, in particular VCSEL (Vertical Cavity Surface Emitting Laser) or VECSEL (Vertical External Cavity Surface Emitting Laser), or a line of these lasers. Generally, any device by means of which energy can be selectively applied to a layer of the building material as wave or particle radiation may be used as irradiator. Instead of a laser, for instance, another light source, an electron beam, or any other energy or, respectively, radiation source may be used which is suitable for solidifying the building material. Instead of deflecting a beam, also the irradiating using a movable line irradiator may be applied. The invention may also be applied to the selective mask sintering, where an extended light source and a mask are used, or to the High-Speed-Sintering (HSS), where a material enhancing (absorption sintering) or reducing (inhibition sintering) the absorption of radiation at the points corresponding to the object cross-section is selectively applied onto the building material, and then an irradiation is performed nonselectively in a large-area manner or using a movable line irradiator.

Instead of supplying energy, the selective solidification of the applied building material may also be performed by 3D printing, for instance, by applying an adhesive. Generally, the invention relates to generatively manufacturing an object by means of a layer-by-layer application and selective solidification of a building material in powder form, independently of the manner in which the building material is being solidified.

As building material, various types of powder may be used, in particular, metal powder, plastic powder, ceramic powder, sand, filled or mixed powders.

The invention claimed is:

1. A powder discharge unit for equipping and/or upgrading an apparatus for generatively manufacturing a three-dimensional object by a selective layer-by-layer solidification of building material in powder form, wherein the apparatus includes a recoater movable across a build area for applying a layer of the building material to the build area and a solidification device for selectively solidifying the applied layer at points corresponding to a cross-section of the object to be manufactured and wherein the apparatus is configured and/or controlled to repeat the steps of applying and selectively solidifying until the object is completed, the powder discharge unit comprising:

a powder container adapted to receive the building material in powder form; and a filling chamber adapted to fill the building material in powder form into the powder container, the powder container having an enclosed space within which powder is contained and further having an opening formed in a bottom portion of the powder container that communicates with the filling chamber and through which powder is conveyed into the powder container, the powder container and the filling chamber otherwise being isolated from each other except through the opening;

a source of a fluidizing gas;

a filling chamber gas inlet in a bottom of the filling chamber;

a powder container gas inlet in a bottom of the powder container; and a supplier communicating the fluidizing gas to each of the gas inlets, wherein the building material in powder form contained in the powder container and the building material in powder form contained in the filling chamber are fluidised independently of one another.

2. The powder discharge unit according to claim 1, further comprising a dosing device configured to dispense the building material in powder form contained in the powder container to a recoating unit of the recoater continuously or in portions.

3. The powder discharge unit according to claim 1, further comprising a porous plate and/or a perforated plate in the bottom of the powder container and/or the filling chamber, the porous plate and/or the perforated plate permitting gas to be directed into the powder container and/or into the filling chamber independently of one another, wherein the bottom includes a heating element adapted to heat one or more of the porous plate, the perforated plate, and the gas.

4. The powder discharge unit according to claim 1, wherein the powder container and the filling chamber are partial chambers of a container that includes a separating wall that separates the powder container and the filling chamber into sections.

5. The powder discharge unit according to claim 1, wherein the powder container and the filling chamber are formed as two separate interconnected units.

6. The powder discharge unit according to claim 1, wherein a connecting point between the filling chamber and the powder container is disposed at a bottom of the powder discharge unit.

7. The powder discharge unit according to claim 1, wherein the powder container includes a radiation heater adapted to preheat the building material in powder form received therein, and wherein the radiation heater is disposed at an upper side of the powder container.

8. A powder discharge unit in an apparatus for generatively manufacturing a three-dimensional object by a selective layer-by-layer solidification of a powder building material, the apparatus including a recoater mounted for movement across a build area and applying consecutive layers of the building material to the build area, and a solidification device which selectively solidifys the applied layer at points corresponding to a respective cross-section of the object to be manufactured, with the steps of applying and selectively solidifying being repeated until the object is completed, the powder discharge unit comprising:

a powder container which receives powder therein; and a filling chamber associated with the powder container into which powder is received through a filling chamber opening in an upper portion of the filling chamber, the powder container having an enclosed space within which powder is contained; the powder container further having a powder container opening formed in a bottom portion of the powder container communicating with the filling chamber and through which powder is conveyed into the powder container, the powder container and the filling chamber otherwise being isolated from each other except through the powder container opening;

a source of a fluidizing gas;

a filling chamber gas inlet in a bottom of the filling chamber; a powder container gas inlet in a bottom of the powder container;

a supplier communicating fluidizing gas to each of the gas inlets.

9. The powder discharge unit of claim 8, wherein the filling chamber and the powder container are fluidised independently of one another.

10. The powder discharge unit of claim 8, wherein the powder discharge unit is mounted to travel with the recoater.

11. The powder discharge unit of claim 10, wherein powder is conveyed from the filling chamber through the powder container opening through action of the fluidized gas.

12. The powder discharge unit of claim 11, wherein powder is maintained in the powder container with a fluidized surface that is above a top of the powder container opening.

* * * * *